United States Patent
Davies et al.

(10) Patent No.: US 9,961,381 B2
(45) Date of Patent: May 1, 2018

(54) REDUCING LATENCY IN PRESENTING DIGITAL VIDEOS

(71) Applicant: Google LLC, Mountain View, CA (US)

(72) Inventors: Scott Tadashi Davies, Santa Monica, CA (US); Justin Lewis, Marina del Rey, CA (US)

(73) Assignee: Google LLC, Mountain View, CA (US)

(*) Notice: Subject to any disclaimer, the term of this patent is extended or adjusted under 35 U.S.C. 154(b) by 0 days. days.

(21) Appl. No.: 15/240,348

(22) Filed: Aug. 18, 2016

(65) Prior Publication Data

US 2018/0054635 A1 Feb. 22, 2018

(51) Int. Cl.
| | |
|---|---|
| H04N 21/2343 | (2011.01) |
| H04L 29/08 | (2006.01) |
| H04N 21/61 | (2011.01) |
| H04N 21/438 | (2011.01) |
| H04N 21/433 | (2011.01) |
| H04N 21/231 | (2011.01) |

(52) U.S. Cl.
CPC ......... *H04N 21/2343* (2013.01); *H04L 67/18* (2013.01); *H04N 21/23106* (2013.01); *H04N 21/4331* (2013.01); *H04N 21/4384* (2013.01); *H04N 21/6125* (2013.01); *H04L 67/2852* (2013.01)

(58) Field of Classification Search
CPC ........... H04N 21/2343; H04N 21/6125; H04N 21/4384; H04N 21/4331; H04N 21/23106
See application file for complete search history.

(56) References Cited

U.S. PATENT DOCUMENTS

| | | | |
|---|---|---|---|
| 8,719,865 B2 | 5/2014 | Moonka et al. | |
| 2005/0021822 A1* | 1/2005 | Cherkasova | H04L 29/06027 709/232 |
| 2007/0027764 A1* | 2/2007 | Masuo | G06Q 30/0273 705/14.69 |
| 2012/0130805 A1 | 5/2012 | On et al. | |
| 2015/0120470 A1 | 8/2015 | Roever et al. | |
| 2016/0092781 A1* | 3/2016 | Byrnes | G06Q 30/0255 706/52 |

\* cited by examiner

*Primary Examiner* — Yassin Alata
(74) *Attorney, Agent, or Firm* — Fish & Richardson P.C.

(57) ABSTRACT

Methods, systems, and apparatus, including computer programs encoded on a computer storage medium, for reducing latency in presenting digital videos. In one aspect, a system includes a front-end server that provides videos and local servers that each include a cache for storing videos that have been partially presented at client devices located in a same geographic location as the local server. The system includes a back-end server that selects a video in response to a content request received from a client device located in the same geographic location as a local server. The back-end server provides, to the client device, at least a portion of the video and determines that less than all of the video was presented at the client device. The back-end server reduces latency in presenting additional portions of the video at the client device by storing the video in the cache of the local server.

20 Claims, 3 Drawing Sheets

REDUCING LATENCY IN PRESENTING DIGITAL VIDEOS

BACKGROUND

This specification relates to downloading and streaming videos over a network.

The Internet facilitates the exchange of information and transactions between users across the globe. This exchange of information enables data providers to provide data to a variety of users. For example, data providers can provide information by downloading or streaming audio and video files to user devices over the Internet.

SUMMARY

This specification describes technologies relating to reducing latency in downloading and streaming audio and video content.

In general, one innovative aspect of the subject matter described in this specification can be embodied in a system that includes one or more front-end servers that receive content requests from client devices and provide videos in response to the content requests; local servers that each include a local cache for storing videos that have been partially presented at one or more client devices located in a same geographic location as the local server; and a back-end server that: selects a video in response to a first content request received from a given client device located in the same geographic location as a given local server of the local servers; provides, to the given client device, at least a portion of the video; determines that less than all of the video was presented at the given client device; in response to determining that less than all of the video was presented at the given client device: reduces latency in subsequently presenting additional portions of the video at the given client device by storing the video in the local cache of the given local server; and adjusts distribution criteria for the video for subsequent content item requests received from the given client device based on how much of the video was already presented at the given client device; and causes the selected video to be transmitted from the local cache of the given local server to the given client device and the video to be presented at the given client device in response to receiving a second content request. Other embodiments of this aspect include corresponding apparatus, methods, and computer programs, configured to perform the actions of the methods, encoded on computer storage devices.

These and other embodiments can each optionally include one or more of the following features. In some aspects, the back-end server provides at least a portion of the video to multiple client devices in the same geographic area in response to a respective content request received from each of the multiple client devices; determines that a complete duration of the video has been presented at each of the multiple client devices and the given client device; and removes the video from the local cache in response to determining that the complete duration of the video has been presented at each of the multiple client devices and the given client device.

In some aspects, adjusting distribution criteria for the video for subsequent content item requests received from the given client device includes reducing a selection score parameter for presentation of the video at the given client device. In some aspects, adjusting distribution criteria for the video for subsequent content item requests received from the given client device includes increasing a predicted play through rate of the video for the subsequent content item requests.

In some aspects, the distribution criteria for the video includes a set of keywords for which the video is eligible to be provided. Adjusting distribution criteria for the video can include expanding the set of keywords to include additional keywords not previously included in the set of keywords. In some aspects, the back-end server provides the video to the one or more front-end servers and the one or more front-end servers provide the video to the given client device.

Particular embodiments of the subject matter described in this specification can be implemented so as to realize one or more of the following advantages. Latency in presenting a video at a client device and/or downloading a video to a client device can be reduced by storing partially-presented videos (e.g., videos in which part, but not all, of the video was presented at the client device) at a local cache for the client device. In addition, network bandwidth used for transferring videos between two devices (e.g., between servers or between a server and a client device) can be reduced by storing partially-presented videos at the local cache rather than transferring the video between the two devices each time the video is to be presented. The amount of network bandwidth used can be further reduced by reducing the number of requests for videos transmitted across the network due to the requested videos being stored in the local cache. By caching videos that are more likely to be viewed by a user or that are more likely to be selected for presentation to a user, fewer videos may be cached, freeing up memory space for other data.

The details of one or more embodiments of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

The latency in presenting digital videos at a client device can be reduced by storing videos that have been partially presented (e.g., some, but less than all of the video was presented) at the client device in a local cache, or other local storage, for the client device. In general, a user that has viewed less than all of a video is more likely to view the remainder of the video or at least more of the video if the video or a prompt to start the video is subsequently provided to the user. By storing these partially-presented videos in a local cache, the video may not be transmitted over a network, or the distance of network over which the video is transmitted can be reduced, resulting in a reduction in latency, a reduction in consumed network bandwidth, and a reduction in the demand placed on network resources.

The local cache can be local memory, e.g., high-speed memory, installed on the client device or part of a local server or local data center that is in a same geographic area of the client device or within a threshold distance of the client device. For example, videos may be stored in a primary data storage location, e.g., a primary data center. When a video is sent from the primary data storage location to a given client device, the video can be cached at the local server or local data center that is located in the same geographic location as the given client device. In this way, the video can be transmitted from the local server or local data center to the given client device for subsequent video presentations rather than from the primary server which may be hundreds of miles further away from the client device than the local server or local data center. Storing the video at the local server can also reduce network traffic between the primary server and the local server as the primary server does not have to send the video to the local server for each presentation of the video at the given client device.

Distribution criteria for a video that was partially presented at a given client device can be adjusted for subsequent content requests that are received from the given client device. For example, the video may be provided to the given client device in response to a content request received from the given client device. As the user of the given client device is likely to view more of the video if given the opportunity in the future, the distribution criteria for the video may be broadened for subsequent content requests that are received from the given client device. For example, the topics, categories, or keywords for which the video is eligible for distribution may be expanded to include additional topics, categories, or keywords. In another example, a selection parameter, e.g., a predicted video play through rate, may be adjusted for use in selecting videos in subsequent content requests.

Figure 1:
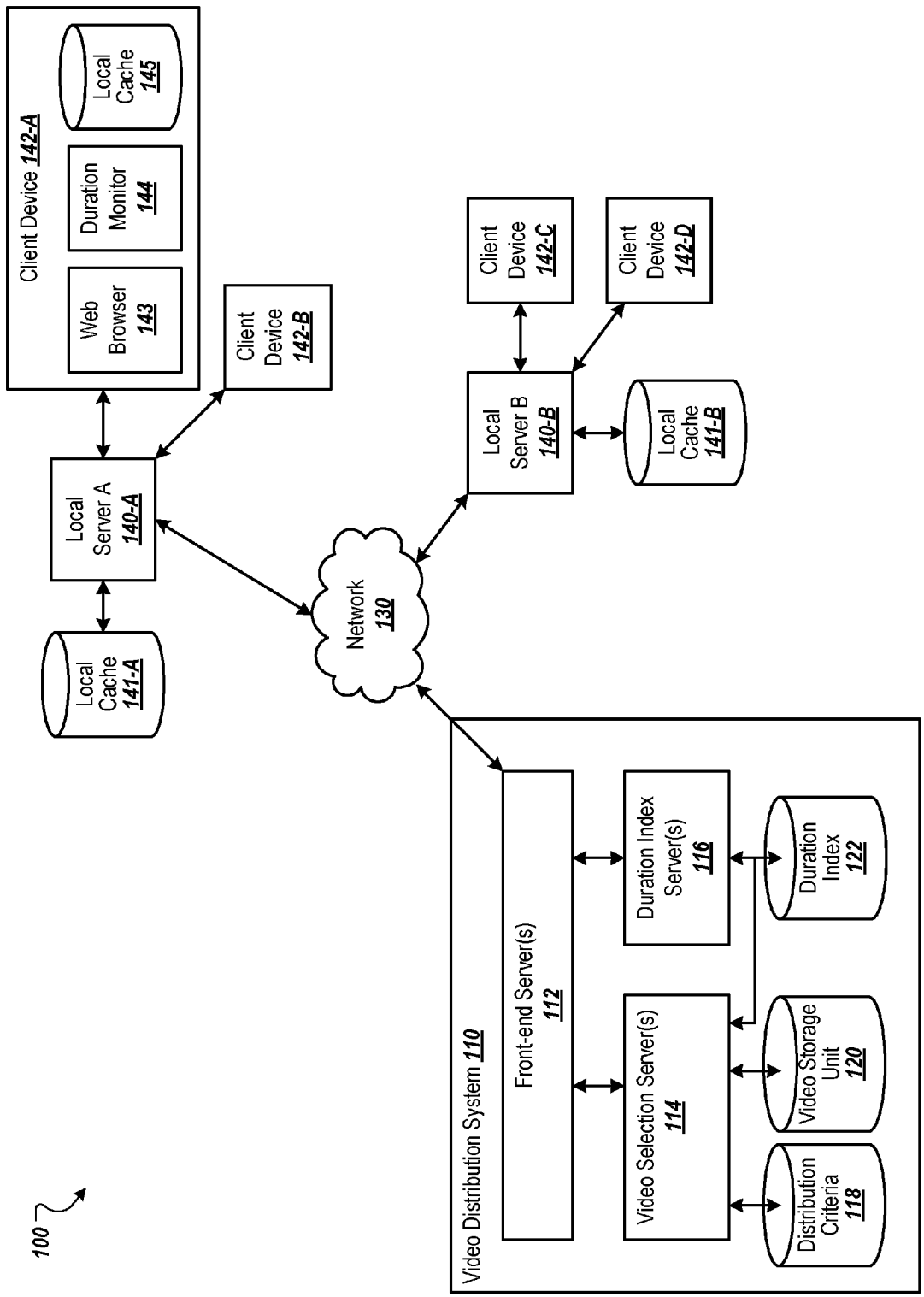
FIG. 1 is an example environment in which a video distribution system sends videos to client devices.

FIG. 1 is an example environment 100 in which a video distribution system 110 sends videos to client devices 142 (e.g., client devices 142-A-142-D). Although the example environment 100 is discussed in terms of a video distribution system 110 that distributes videos, similar components of the environment 100 and techniques implemented by the components can be used to distribute other types of content, such as music, voice, podcasts, other audio, and/or other appropriate content.

The video distribution system 110 includes one or more front-end server(s) 112. The front-end server(s) 112 can receive requests for videos from client devices 142 over a network 130 and provide videos to the client devices 142 in response to the requests. The network 130 can include a local area network (LAN), a wide area network (WAN), the Internet, a mobile network, or a combination thereof.

The requests can be requests for particular videos. For example, a user may select a link to a video presented on a web page, on an application page of a native application, or on other types of electronic resource. The requests can also be content requests for videos and/or other content to be presented with an electronic resource. For example, an electronic resource can include one or more slots for presenting additional content that may be of interest to a user viewing the electronic resource. When the electronic resource is loaded on a client device 142, the client device 142 may transmit a content request for a video to the front-end server(s) 112. In another example, a publisher of an electronic resource may send a content request to the front-end server(s) 112 for one or more videos to embed in the electronic resource prior to sending the electronic resource to a client device 142. In yet another example, a search engine may send a content request to the front-end server(s) 112 for one or more videos related to a search query received by the search engine. When a content request is received, the front-end server(s) 112 may send the content request to one or more video selection server(s) 114.

The video selection server(s) 114, which may be back-end server(s), can select a video to provide in response to a content request. The videos from which the video selection server(s) 114 can select can be stored in a digital video storage unit 120. In some implementations, the video selection server(s) 114 selects a video for a content request based on data included with the content request and/or distribution criteria for each of the videos. For example, the distribution criteria for a video can include topics, categories, or content of electronic resources with which the video is eligible to be presented. The topics, categories, and content can be expressed as keywords. Similarly, the electronic resource can be associated with keywords for topics, categories, and/or content presented by the electronic resource. The keywords of the electronic resource can be provided with the content request or identified based on data identifying the electronic resource, e.g., a URL for the electronic resource. The keywords of a content request received from a search engine can include keywords of a search query received by the search engine. If one or more keywords of a content request match one or more keywords for a given video, the given video may be eligible to be provided in response to the content request.

The distribution criteria, which can be stored in a distribution criteria data storage unit 118, can also include selection parameters for each video. An example selection parameter is a predicted play through rate for a video. A predicted play through rate for a video can be a measure of the likelihood that the entire video, or at least a threshold amount of the video, will be viewed if presented at a client device 142. The predicted play through rate for a video can be based on the electronic resource with which the video will be presented and/or the client device 142 (or user of the client device 142) at which the video will be presented. As discussed in more detail below, the predicted play through rate for a given video and for a given client device (or given user) can vary based on the amount of the given video that has been previously presented at the given client device. In general, the video play through rate for a given video and a given client device increases with an increase in the duration of the video previously presented at the given client device or to the given user.

Another example selection parameter is a selection score parameter that specifies an amount that a publisher of the video is willing to pay for presentation of the video in response to a content request. The selection score parameter may be based on presentation of the entire video or a threshold amount of the video, e.g., 90% of the full duration of the video. The selection score parameter may also be based on the topic, category, and/or content of the electronic resource with which the video will be presented. For example, the publisher may specify multiple selection score parameters, one for each keyword or set of keywords for which the video is eligible.

The video selection server(s) 114 may select a video to provide in response to a content request based on the selection parameters. For example, the video selection server(s) 114 may identify a set of videos that are eligible to be provided in response to the content request based on one or more keywords of the content request matching one or more keywords of the eligible videos. The video selection server(s) 114 may then select, from the set of eligible videos, a video based on the selection parameters. In some implementations, the video selection server(s) 114 determines a score for each eligible video based on a combination (e.g., multiplicative product) of the predicted play through rate for the eligible video and the selection score parameter for the eligible video. The video selection server(s) 114 can select a video based on the determined scores, e.g., the video having the highest score.

The video selection server(s) 114 can provide the selected video to the front-end server(s) 112. In turn, the front-end server(s) 112 can provide the video to the client device 142 from which the content request was received. In some implementations, as described in more detail below, the front-end server(s) 112 provide the video to the client device 142 by way of a local server 140 (e.g., local server 140-A or 140-B).

A client device, such as the client device 142-A, can include a web browser 143, a duration monitor 144, and a local cache 145. The web browser 143 can present web pages requested by a user of the client device 142-A. With the web pages, the web browser 143 can also present videos received from the video distribution system 110. For example, as described above, a web page can include one or more slots for content, such a videos. A web page can include code that causes the client device 142-A to request a video from the video distribution system 110 when the web browser 143 loads the web page. In another example, a publisher of a web page, or another entity, can include a video with a web page prior to sending the web page to the client device 142-A.

In addition to, or in place of, the web browser 143, the client device 142-A can include one or more applications, e.g., native applications developed for a particular platform or particular operating system of the client device 142-A and executing at the client device 142-A. Videos can also be presented with the applications. For example, a video can be requested for presentation with application pages of the application.

The duration monitor 144 can monitor the duration of a video that has been presented at the client device 142-A. In some implementations, the duration monitor 144 periodically determines the percent of the video that is currently presented on the display of the client device 142-A. The duration monitor 144 can then generate a distribution that maps an amount of time that each segment of the video was presented. For example, a video may have a total duration of 100 seconds. In this example, it would typically take 25 seconds to present 25% of the video. Thus, if a user watches 25% of the video from the beginning of the video, the distribution would indicate that the segment of the video that corresponds to 0-25% of the video was presented for about 25 seconds. The duration monitor 144 can use the distribution to determine the total duration of the video that was presented at the client device 142-A and which segments of the video were presented at the client device 142-A.

The duration monitor 144 can provide, to the front-end server(s) 112, data specifying the duration of a video that has been presented at the client device 142-A. The data can include a video identifier for the video, duration data specifying the duration of the video that was presented, and a unique identifier for client device 142-A. The front-end server(s) 112 can provide the data to one or more duration index server(s) 116 that store the data in a duration index 122. As described in more detail below, the video selection server(s) 114 can use the duration to adjust selection parameters of the video for subsequent presentations at the client device 142-A. The duration index server(s) 116 may be implemented as back-end servers.

The local cache 145 can store partially-presented videos for presentation in response to subsequent content requests. For example, the video selection server(s) 114 may select a given video for presentation at the client device 142-A in response to a first content request received from the client device 142-A. A portion of the given video less than all of the given video may be presented at the client device 142-A. For example, the user may navigate away from the web page with which the given video is presented or stop the given video before the entire video is presented. The client device 142-A may store the given video in the local cache 145. In this way, if the video selection server(s) 114 select the given video for presentation in response to a second content request subsequent to the first content request, the latency in presenting the video can be reduced as the video does not have to be sent from the front-end server(s) 112 to the client device 142-A over the network 130. In addition, network traffic is reduced by avoiding transmitting the given video across the network 130 for the second and subsequent presentations of the video at the client device 142-A. When the given video has been completely presented at the client device 142-A, or at least a threshold amount of the given video has been presented at the client device 142-A, the given video can be removed from the local cache 145 to make memory space available for other videos or other data.

In some implementations, local servers 140-A and 140-B can store partially-presented videos in respective local caches 141-A and 141-B. For example, the environment 100 can include a local server 140 for each of multiple different geographical areas. The local server 140 for a given geographical area can store partially-presented videos for client devices that are located in the given geographical area, for client devices that are located within a threshold distance of the given geographical area, or for client devices to which the local server is the closest local server. For example, the local server 140-A can store, in the local cache 141-A, videos that have been partially presented at the client device 142-A and/or the client device 142-B. Similarly, the local server 140-B can store, in the local cache 141-B, videos that have been partially presented at the client device 142-C and/or the client device 142-D. In this way, the videos can be transferred between the local servers 140 and the client devices 142 over shorter distances and using fewer network resources, resulting in reduced latency in presenting the videos and less demand on network resources.

For example, the client device 142-D may send a first content request to the video distribution system 110. In response, the front-end server(s) 112 of the video distribution system 110 may send a video to the local server 140-B for the geographic area in which the client device 142-D is located. The local server 140-B may store the video in the local cache 141-B and send, or stream, the video to the client device 142-D. If all of the video is not presented at the client device 142-D, or if less than a threshold amount of the video is presented at the client device 142-D, the local server 140-B may maintain the video in the local cache 141-B. If the video selection server(s) 114 selects the video in response to a second content request sent by the client device 142-D subsequent to the first content request, the local server 140-B can obtain the video from the local cache 141-B and provide, e.g., stream, the video to the client device 142-D.

If a local server 140 has provided the same video to multiple client devices 142, the local server 140 may store a single copy of the video in its local cache 141 for the multiple client devices 142. If the video has been partially presented at multiple client devices, the local server 140 may maintain the video in the local cache 141 until each of the client devices 142 have presented the entire video or at least a threshold amount of the video. When each client device 142 serviced by the local server 140 has presented the entire video or at least the threshold amount of the video, the local server 140 may remove the video from the local cache 141 to make memory space available for additional videos or other data.

After a video is initially selected for presentation at a client device 142 and partially presented at the client device 142 in response to a content request, the distribution criteria for the video with respect to that client device 142 can be adjusted, e.g., by the video selection server(s) 114. For example, a user that has viewed part of a video is more likely to view additional portions or the remainder of the video. In addition, by adjusting the distribution criteria for the video with respect to the client device 142, it is more likely that a cached video is selected for presentation rather than a video that has to be transmitted over the network 130 from the video distribution system 110.

In some implementations, the topics, categories, and/or keywords for the video can be expanded to include additional topics, categories, and/or keywords for content requests received from the client device 142. For example, a given video may be eligible for presentation in response to content requests that include the keyword "soccer." After the video has been selected and partially presented in response to a content request received from a given client device 142, the keywords for the video may be expanded to include other keywords, e.g., sports, entertainment, etc., for content requests received from the given client device 142. In another example, the distribution criteria may be adjusted to remove keyword restrictions, allowing the video to be presented in response to most content requests. By expanding the topics, categories, and/or keywords for which the video is eligible for content requests received from the client device 142, the video has a higher likelihood of being selected for subsequent presentations at the client device 142 and a higher likelihood that the user of the client device 142 finishes watching the entire video. For example, the additional keywords may allow the video to be presented with electronic resources related to uncommon topics for which content slot inventory may not be used or for which publishers specify lower selection score parameters for their videos.

Although the topics, categories, and/or keywords may be expanded for a given user device 142 at which the video was partially presented, this distribution criteria may not be adjusted for other client devices that have not yet presented at least a portion of the video. Instead, the distribution criteria may be adjusted for client devices 142 at which the video was partially presented to increase the likelihood that a partially presented video is subsequently fully presented.

In some implementations, the distribution criteria for the video and a given user device 142 is adjusted based on the duration of the video that was presented and/or the number of times that at least a portion of the video was presented at the given client device 142. For example, after an initial presentation of part, but not all of the video, at the given client device 142, the topics, categories, and/or keywords for the given video may be expanded to include some topics, categories, and/or keywords. After a second presentation of the video at the given client device 142, the topics, categories, and/or keywords can be expanded again to include additional topics, categories, and/or keywords. In this example, the first expansion may include topics, categories, and/or keywords similar to, or broader than, the original topics, categories, and/or keywords for which the video was eligible. For example, if the original keyword is "soccer," the first expansion may add the keyword "sports." The second expansion may then add an even broader keyword "entertainment."

The number of topics, categories, and/or keywords can be similarly expanded with increases in the duration of the video presented. For example, if a first threshold duration of the video is presented at the given client device, the first expansion of topics, categories, and/or keywords may occur. After a second threshold duration of the video is presented at the given client device, the second expansion of topics, categories, and/or keywords may occur. Additional expansions can occur with additional threshold durations.

In some implementations, the selection parameters for a partially-presented video may be adjusted for the client device 142 at which the video was presented. As described above, a user that has viewed part of a video is more likely to view additional portions or the remainder of the video. Thus, the predicted play through rate for the video can be increased for the video with respect to the client device 142 at which the video was presented. The predicted play through rate may be adjusted based on the duration or percent of the video that has already been presented at the client device 142. For example, the predicted play through rate may increase with proportional, or non-proportional, increases in the duration or percent of the video that has already been presented at the client device. In implementations in which videos are selected based on predicted play through rates, e.g., in combination with selection score parameters, the likelihood that the video will be selected in response to content requests received from the client device 142 can increase with an increase in the predicted play through rate for the video.

The selection score parameter for a partially-presented video can be adjusted for the client device 142 at which the video was presented. For example, the selection score parameter may be reduced based on the duration of the video that has already been presented and/or the number of times a portion of the video has been presented at the client device 142. In this example, the selection score parameter may be reduced proportional to an increase in the duration of the video that has been previously presented at the client device 142 and/or the number of times a portion of the video has been previously presented at the client device 142. For example, if 50% of the video has been presented, the selection score parameter may be reduced by 50%.

In some implementations, a publisher of a video may be charged based on the duration of its video that has been presented at a client device 142. In this example, the original selection score parameter specified by the publisher for the video may be reduced for subsequent content requests received from the client device 142 based on the amount charged for the previous presentation of the content item. For example, if the original selection score parameter was ten units, e.g., ten dollars, the publisher may be charged 2 units for 20% of the video being presented at the client device 142. If another content request is received from the client device 142, the selection score parameter used for selecting the video may be reduced to 8 units. In this way, the publisher of the video may be charged based on the duration of the video presented at the client device 142 with a maximum amount equal to the original selection score parameter specified by the publisher.

The amount that the selection score parameter is reduced may not be linear with respect to the duration of the video previously presented in some implementations. For example, 10% of the duration of the video may correspond to 30% of the selection score parameter. In another example, a factor may be used to further adjust selection score parameters based on the number of times the video has been presented at the client device 142 in combination with the duration of the video that has been presented at the client device 142. This factor can be used to charge publishers more or less based on the number of presentations of the video it took for the user of the client device 142 to watch the entire video. In this example, the duration may be multiplied by the factor and the result may be used to determine the reduction of the selection score parameter.

In another example, there may be a cost factor associated with each presentation of a portion of a video. The selection score parameter may be reduced by the factor after each presentation of the video. For example, the initial selection score parameter for a ten minute video may be ten units. The selection score parameter for a given client device 142 may be reduced by one unit for each minute of video presented at the given client device. In addition, the cost factor may be one unit. In this example, if one minute of the video is presented at the given client device, the selection score parameter may be reduced by one unit for the duration and one unit based on the factor. Thus, the selection score parameter for the video for a subsequent content request received for the given client device may be eight units. If the video is presented again at the given client device for another minute (e.g., the second minute of the video is different from the initial minute presented at the given client device) in response to a subsequent content request received for the given client device, the selection score parameter may be reduced by two units again, resulting in a selection score parameter of six units for subsequent content requests received for the given client device 142.

Although the selection score parameter for a given video may be reduced with an increase in duration of the given video that has been presented, the likelihood that the given video will be selected can remain as high as, or about as high as, the likelihood that was for the original selection score parameter based on the increase in the predicted play through rate and/or the increase in the number of topics, categories, and/or keywords for which the given video is now eligible for the client device 142 at which the given video was partially presented. For example, the predicted play through rate for the given video may increase with an increase in the duration of the given video that has been presented at a faster rate than the bid decreases with an increase in the duration of the given video that has been presented. However, the reduced selection score parameter may make it more likely that another video that has not been previously presented at the client device 142 will be selected, while still allowing for subsequent selections of the given video with the reduced selection score parameter to increase the likelihood that the user of the client device 142 watches the entirety of the given video. For example, the reduced selection score parameter may make other videos more likely to be selected than the given video for content requests that specify the original keywords for the video. However, the given video may be eligible for presentation in response to other content requests due to the expanded keywords for the given video.

In some implementations, the selection score parameter for a video and a given client device 142 is not reduced (e.g., based on duration) if the portion of the video presented is the same portion previously presented at the given client device 142. For example, if the user of the client device 142 watched the first minute of the video a second time rather than progressing into the video, the publisher may not be charged based on duration and the selection score parameter may be reduced by other factors, but not based on duration.

The adjusted selection score parameter for a given video and a given client device 142 can be determined after each presentation of the given video at the given client device 142. The adjusted value can be stored in an index of the distribution criteria data storage unit 118. This allows for quicker lookup at video selection time than having to determine the adjusted selection score parameter in response to a content request received from the given client device 142, resulting in reduced latency in providing a selected video to the given client device 142.

If a video has been presented in full, or if at least a threshold amount of the video has been presented, at a given client device 142, the distribution criteria that had been adjusted based on a partial presentation of the video may be reset to their original settings or adjusted to reduce the likelihood that the video will be selected again for the given client device 142. This can prevent user frustration caused by being shown the same videos many times although the user had already viewed the entire video or at least a threshold portion of the video.

Figure 2:
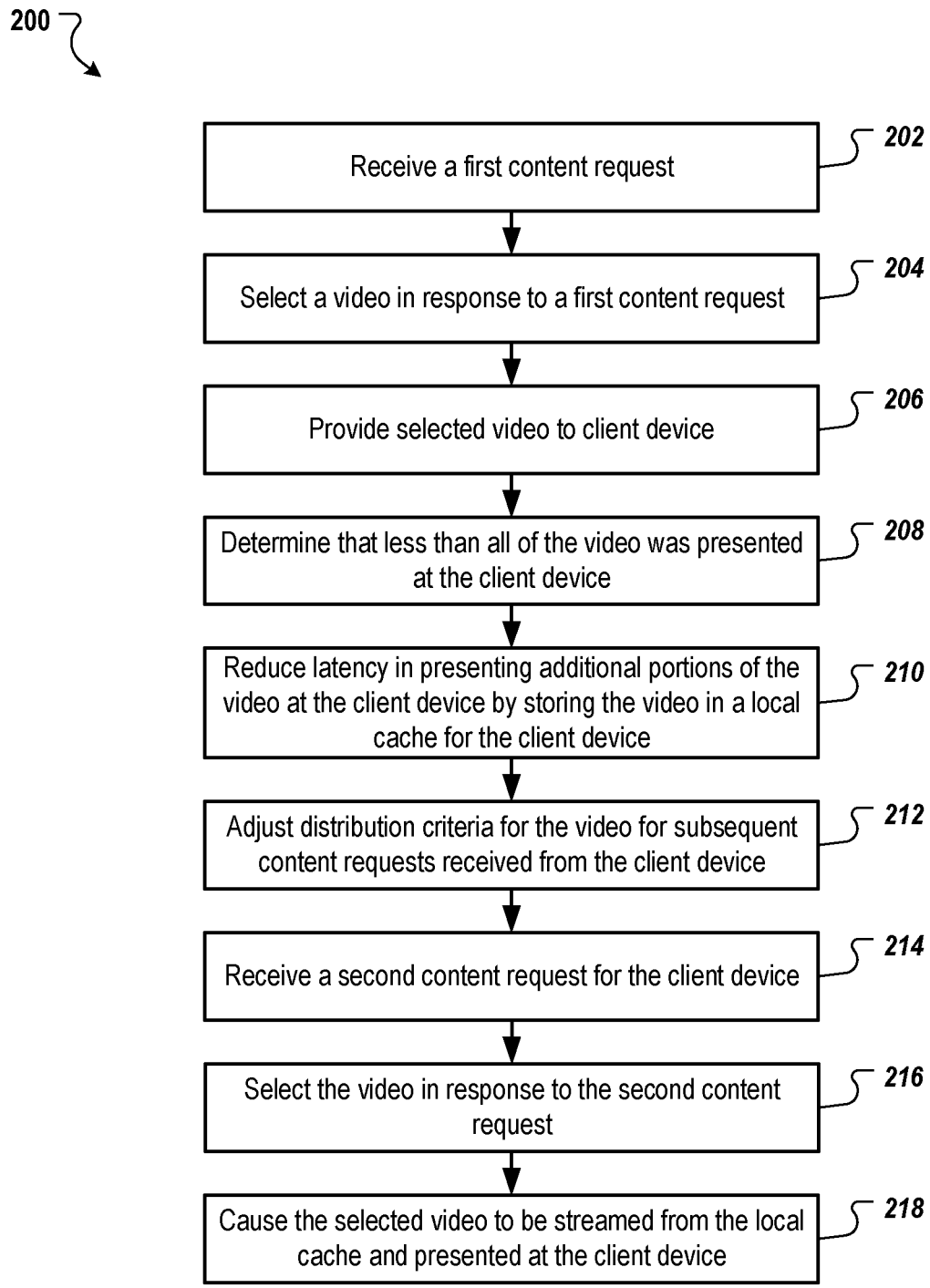
FIG. 2 is a flow chart of an example process for downloading and presenting a video.

FIG. 2 is a flow chart of an example process 200 for downloading and presenting a video. Operations of the process 200 can be implemented, for example, by one or more data processing apparatus, such as the video distribution system 110 of FIG. 1. The process 200 can also be implemented by instructions stored on computer storage medium, where execution of the instructions by a data processing apparatus cause the data processing apparatus to perform the operations of the process 200.

A first content request is received (202). For example, a given client device may send the first content request in response to loading an electronic resource, e.g., a web page or application page, that includes one or more content slots. The first content request may include one or more keywords for the electronic resource. For example, the one or more keywords may be based on a topic of the electronic resource, a category of the electronic resource, content presented on the electronic resource, or keywords of a search query entered at the given client device. In place of the keyword(s), or in addition to the keyword(s), the first content request may include data identifying the electronic resource. In this way, keywords associated with the identified electronic resource can be accessed, e.g., from an index of electronic resources and associated keywords.

A video is selected in response to the first content request (204). The first video may be selected based on distribution criteria for the video. For example, a set of eligible videos may be identified based on each eligible video having one or more associated distribution keywords that match one or more keywords for the electronic resource. From the eligible videos, a video may be selected based on selection parameters for the videos. For example, the video may be selected based on a combination of a selection score parameter and a predicted play through rate for the video being greater than combinations of selection score parameters and predicted play through rates for other eligible videos. The predicted play through rate for a video may be based on the electronic resource for which the first content request was received, the given client device from which the first content request was received, and/or an actual play through rate for the video, e.g., when presented with the electronic resource.

The selected video is provided to the given client device from which the content request was received (206). For example, the selected video may be provided to the given client device over a network. The selected video may also be provided to a local server for the given client device. For example, the selected video may be provided to a local server that is located in the same geographical area as the given client device or that is located within a threshold distance of the given client device. In turn, the local server can provide at least a portion of the selected video to the given client device. For example, the local server may stream the selected video to the given client device until the user navigates away from the electronic resource, the user stops the video, or the entire video has been presented at the given client device.

A determination is made that less than all of the video was presented at the given client device (208). For example, the user of the given client device may navigate away from the electronic resource with which the video was being presented or stop the video before the entire video was presented at the given client device.

Latency in subsequently presenting additional portions of the video at the given client device is reduced by storing the video in a local cache for the given client device (210). For example, the video may be stored in memory, installed on the given client device or memory of the local server that is located in the same geographical area as the given client device or that is located within a threshold distance of the given client device. In this way, the additional portions of the video can be subsequently presented at the given client device without being sent over a network, or over a shorter distance, than if the video was not stored in a local cache.

The distribution criteria for the video for subsequent context requests received for the given client device are adjusted (212). For example, the keywords for which the video is eligible to be provided to the given client device may be expanded to include additional keywords. In addition, or in the alternative, one or more selection parameters may be adjusted for the video and the given client device. For example, the selection score parameter may be reduced based on the duration of the video presented at the given client device and/or the number of times the video has been presented at the given client device. In another example, the predicted play through rate for the video and the given client device may be increased based on the duration of the video presented at the given client device. The adjusted distribution criteria may be stored in an index for quick access in response to subsequent content requests received from the given client device.

A second content request is received for the given client device (214). Similar to the first content request, the given client device may send the second content request in response to loading an electronic resource (e.g., the same as or different from the electronic resource that initiated the first content request) that includes one or more content slots. The second content request may include one or more keywords that may be based on a topic of the electronic resource, a category of the electronic resource, content presented on the electronic resource, or keywords of a search query entered at the given client device.

The video is selected for presentation at the given client device (216). For example, a second set of eligible videos may be identified based on the on the eligible videos having one or more associated distribution keywords that match one or more keywords for the electronic resource. For the video that was partially presented at the client device in response to the first content request, the adjusted distribution criteria for the video and the given client device may be compared to the one or more keywords for the electronic resource. For example, an expanded set of keywords for the video may be compared to the one or more keywords for the electronic resource.

The video may be selected from the set of eligible videos based on the adjusted selection parameters for the video and the given client device. For example, a combination of the adjusted selection score parameter and the adjusted predicted play through rate may be compared to combinations of selection score parameters and predicted play through rates for the other eligible videos. If the combination of the adjusted selection score parameter and the adjusted predicted play through rate for the video is greater than combinations of selection score parameters and predicted play through rates for the other eligible videos, the video may be selected.

The video is caused to be streamed, or otherwise provided, from the local cache to the client device and to be presented on a display of the client device (218). For example, the video can be streamed from the local cache installed on the client device or from the local cache of a local server.

Figure 3:
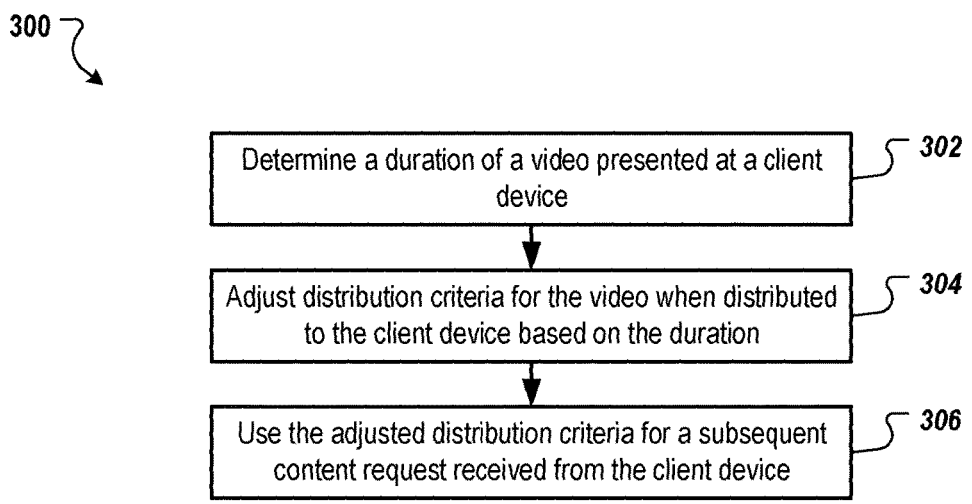
FIG. 3 is a flow chart of an example process for updating distribution criteria for a video and using the updated distribution criteria for content requests.

FIG. 3 is a flow chart of an example process 300 for updating distribution criteria for a video and using the updated distribution criteria for content requests. Operations of the process 300 can be implemented, for example, by one or more data processing apparatus, such as the video distribution system 110 of FIG. 1. The process 300 can also be implemented by instructions stored on computer storage medium, where execution of the instructions by a data processing apparatus cause the data processing apparatus to perform the operations of the process 300.

A duration of a video presented at a given client device is determined (302). For example, the duration of the video presented at the given client device may be received from a duration monitor, such as the duration monitor 144 of FIG. 1. The duration may indicate the total duration of the video that has been presented over one or more presentations of the video. In another example, the duration may indicate the duration of the video presented during a current presentation of the video.

Distribution criteria for the video with respect to the given client device is adjusted (304). The distribution criteria may be adjusted to reflect the total duration of the video that has been presented at the given client device and/or the number of times the video has been at least partially presented at the given client device. For example, the topics, categories, and/or keywords for which the video is eligible for distribution to the given client device may be expanded for one or more presentations of the video at the client device. In addition, or in the alternative, the selection score parameter for the video and the given client device may be reduced based on the duration of the video presented at the given client device and/or the number of times the video has been presented at the given client device. Similarly, the predicted play through rate for the video and the given client device may be increased based on the duration of the video presented at the given client device.

The adjusted distribution criteria are used for subsequent content requests received from the given client device (306). For example, the distribution criteria may be adjusted for each video that has been partially presented at the client device. When subsequent content requests are received from the client device, the adjusted distribution criteria can be used for those videos in video selection processes that are performed in response to the subsequent content requests.

For videos that have not been partially presented at the client device, original distribution criteria for the videos can be used in the subsequent video selection processes.

The distribution criteria for the video and the given video can be adjusted after each presentation of the video at the given client device. For example, if the user of the client device views additional portions of the video that have not yet been viewed in the previous presentations of the video, the distribution criteria may be updated to reflect the total duration of the video presented at the given client device and/or the total number of times the video has been at least partially presented at the client device. If the video has been entirely presented at the client device, or at least a threshold amount of the video has been presented at the client device, the distribution criteria for the video and the given client device can be reset to the original distribution criteria for the video and the video can be removed from the local cache.

Embodiments of the subject matter and the operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer programs, i.e., one or more modules of computer program instructions, encoded on computer storage medium for execution by, or to control the operation of, data processing apparatus. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate physical components or media (e.g., multiple CDs, disks, or other storage devices).

The operations described in this specification can be implemented as operations performed by a data processing apparatus on data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some embodiments, a server transmits data (e.g., an HTML page) to a client device (e.g., for purposes of displaying data to and receiving user input from a user interacting with the client device). Data generated at the client device (e.g., a result of the user interaction) can be received from the client device at the server.

While this specification contains many specific implementation details, these should not be construed as limitations on the scope of any inventions or of what may be claimed, but rather as descriptions of features specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A system comprising:
   one or more front-end servers that receive content requests from client devices and provide videos in response to the content requests;
   a plurality of local servers that each comprise a local cache for storing videos that have been partially presented at one or more client devices located in a same geographic location as the local server;
   a back-end server that:
      selects a video in response to a first content request received from a given client device located in the same geographic location as a given local server of the plurality of local servers, the given local server being different from the back-end server;
      provides, to the given client device, at least a portion of the video;
      determines that less than all of the video was presented at the given client device;
      in response to determining that less than all of the video was presented at the given client device:
         reduces latency in subsequently presenting additional portions of the video at the given client device by storing the video in the local cache of the given local server; and
         adjusts distribution criteria for the video for subsequent content item requests received from the given client device based on how much of the video was already presented at the given client device, including adjusting the distribution criteria such that an increase in how much of the video has already been presented at the given client device results in an increase in a likelihood that the video will be selected for presentation at the given client device in response to subsequent content requests received from the given client device; and
      causes the selected video to be transmitted from the local cache of the given local server to the given client device and the video to be presented at the given client device in response to receiving a second content request.

2. The system of claim 1, wherein the back-end server:
   provides at least a portion of the video to multiple client devices in the same geographic area in response to a respective content request received from each of the multiple client devices;
   determines that a complete duration of the video has been presented at each of the multiple client devices and the given client device; and
   removes the video from the local cache in response to determining that the complete duration of the video has been presented at each of the multiple client devices and the given client device.

3. The system of claim 1, wherein adjusting distribution criteria for the video for subsequent content item requests received from the given client device comprises reducing a selection score parameter for presentation of the video at the given client device.

4. The system of claim 1, wherein adjusting distribution criteria for the video for subsequent content item requests received from the given client device comprises increasing a predicted play through rate of the video for the subsequent content item requests.

5. The system of claim 1, wherein:
the distribution criteria for the video includes a set of keywords for which the video is eligible to be provided; and
adjusting distribution criteria for the video comprises expanding the set of keywords to include additional keywords not previously included in the set of keywords.

6. The system of claim 1, wherein the back-end server provides the video to the one or more front-end servers and the one or more front-end servers provide the video to the given client device.

7. A method for reducing latency in presenting a video and performed by data processing apparatus, the method comprising:
selecting a video in response to a first content request received from a given client device;
providing, to the given client device, at least a portion of the selected video;
determining that less than all of the video was presented at the client device, the portion being less than a complete duration of the video;
in response to determining that less than all of the video was presented at the given client device:
reducing latency in subsequently presenting additional portions of the video at the given client device by storing the video in a local cache for the client device; and
adjusting distribution criteria for the video for subsequent content item requests received from the given client device based on how much of the video was already presented at the given client device, including adjusting the distribution criteria such that an increase in how much of the video has already been presented at the given client device results in an increase in a likelihood that the video will be selected for presentation at the given client device in response to subsequent content requests received from the given client device;
receiving a second content request from the given client device; and
causing the selected video to be streamed from the local cache and presented at the given client device in response to receiving the second content request.

8. The method of claim 7, wherein the local cache comprises local memory installed on the given client device.

9. The method of claim 7, wherein the local cache comprises memory of a server located in a same geographic area of the given client device.

10. The method of claim 9, further comprising:
providing at least a portion of the video to multiple client devices in the same geographic area in response to a respective content request received from each of the multiple client devices;
determining that a complete duration of the video has been presented at each of the multiple client devices and the given client device; and
in response to determining that the complete duration of the video has been presented at each of the multiple client devices and the given client device, removing the video from the local cache.

11. The method of claim 7, wherein adjusting distribution criteria for the video for subsequent content item requests received from the given client device comprises reducing a selection score parameter for presentation of the video at the given client device.

12. The method of claim 7, wherein adjusting distribution criteria for the video for subsequent content item requests received from the given client device comprises increasing a predicted play through rate of the video for the subsequent content item requests.

13. The method of claim 7, wherein:
the distribution criteria for the video includes a set of keywords for which the video is eligible to be provided; and
adjusting distribution criteria for the video comprises expanding the set of keywords to include additional keywords not previously included in the set of keywords.

14. A non-transitory computer storage medium encoded with a computer program, the program comprising instructions that when executed by one or more data processing apparatus cause the data processing apparatus to perform operations comprising:
selecting a video in response to a first content request received from a given client device;
providing, to the given client device, at least a portion of the selected video;
determining that less than all of the video was presented at the client device, the portion being less than a complete duration of the video;
in response to determining that less than all of the video was presented at the given client device:
reducing latency in subsequently presenting additional portions of the video at the given client device by storing the video in a local cache for the client device; and
adjusting distribution criteria for the video for subsequent content item requests received from the given client device based on how much of the video was already presented at the given client device, including adjusting the distribution criteria such that an increase in how much of the video has already been presented at the given client device results in an increase in a likelihood that the video will be selected for presentation at the given client device in response to subsequent content requests received from the given client device;
receiving a second content request from the given client device; and
causing the selected video to be streamed from the local cache and presented at the given client device in response to receiving the second content request.

15. The non-transitory computer storage medium of claim 14, wherein the local cache comprises local memory installed on the given client device or memory of a server located in a same geographic area of the given client device.

16. The non-transitory computer storage medium of claim 15, wherein the operations further comprise:
providing at least a portion of the video to multiple client devices in the same geographic area in response to a respective content request received from each of the multiple client devices;
determining that a complete duration of the video has been presented at each of the multiple client devices and the given client device; and
in response to determining that the complete duration of the video has been presented at each of the multiple client devices and the given client device, removing the video from the local cache.

17. The non-transitory computer storage medium of claim 14, wherein adjusting distribution criteria for the video for subsequent content item requests received from the given client device comprises reducing a selection score parameter for presentation of the video at the given client device.

18. The non-transitory computer storage medium of claim 14, wherein adjusting distribution criteria for the video for subsequent content item requests received from the given client device comprises increasing a predicted play through rate of the video for the subsequent content item requests.

19. The non-transitory computer storage medium of claim 14, wherein:
- the distribution criteria for the video includes a set of keywords for which the video is eligible to be provided; and
- adjusting distribution criteria for the video comprises expanding the set of keywords to include additional keywords not previously included in the set of keywords.

20. The system of claim 5, wherein expanding the set of keywords comprises:
- expanding the set of keywords to include a first set of additional keywords not previously included in the set of keywords in response to determining that a first threshold duration of the video has been presented at the given client device; and
- after expanding the set of keywords to include the first set of additional keywords and additional portions of the video being presented at the given client device, expanding the set of keywords to include a second set of additional keywords not previously included in the set of keywords in response to determining that a second threshold duration of the video has been presented at the given client device.

* * * * *